United States Patent
Richter et al.

(10) Patent No.: US 11,222,426 B2
(45) Date of Patent: Jan. 11, 2022

(54) METHOD FOR PROPERTY FEATURE SEGMENTATION

(71) Applicant: Cape Analytics, Inc., Mountain View, CA (US)

(72) Inventors: Fabian Richter, Mountain View, CA (US); Matthieu Portail, Mountain View, CA (US); Jason Erickson, Mountain View, CA (US)

(73) Assignee: Cape Analytics, Inc., Mountain View, CA (US)

( * ) Notice: Subject to any disclaimer, the term of this patent is extended or adjusted under 35 U.S.C. 154(b) by 0 days.

(21) Appl. No.: 17/336,134

(22) Filed: Jun. 1, 2021

(65) Prior Publication Data

US 2021/0374965 A1   Dec. 2, 2021

Related U.S. Application Data

(60) Provisional application No. 63/033,757, filed on Jun. 2, 2020.

(51) Int. Cl.
| | |
|---|---|
| *G06K 9/00* | (2006.01) |
| *G06T 7/11* | (2017.01) |
| *G06T 7/155* | (2017.01) |
| *G06F 16/903* | (2019.01) |
| *G06N 20/00* | (2019.01) |

(52) U.S. Cl.
CPC .......... *G06T 7/11* (2017.01); *G06F 16/90335* (2019.01); *G06N 20/00* (2019.01); *G06T 7/155* (2017.01); *G06T 2207/10032* (2013.01); *G06T 2207/20041* (2013.01); *G06T 2207/20081* (2013.01); *G06T 2207/30184* (2013.01); *G06T 2207/30188* (2013.01)

(58) Field of Classification Search
CPC ...... G06N 20/00; G06N 5/025; G06N 3/0454; G06N 3/084; G06N 3/08; G06N 3/0472; G06N 7/005; G06N 5/04; G06N 3/006; G06N 3/02; G06N 3/0445; G06N 3/088; G06N 3/126; G06N 5/046; G06F 2113/14; G06F 2113/16; G06F 30/12; G06F 30/13; G06F 30/18; G06F 30/20; G06F 30/27; G06F 3/0484; G06F 21/6218; G06F 21/6254; G06F 16/2264; G06F 16/2465; G06F 16/3347; G06F 40/284; G06F 40/30
See application file for complete search history.

(56) References Cited

U.S. PATENT DOCUMENTS

| | | |
|---|---|---|
| 5,633,946 A | 5/1997 | Lachinski et al. |
| 7,873,238 B2 | 1/2011 | Schultz et al. |
| 7,890,509 B1 | 2/2011 | Pearcy et al. |

(Continued)

OTHER PUBLICATIONS https://capeanalytics.com/commercial-property-identification/.

(Continued)

*Primary Examiner* — Alex Kok S Liew
(74) *Attorney, Agent, or Firm* — Jeffrey Schox; Diana Lin

(57) ABSTRACT

The method for determining property feature segmentation includes: receiving a region image for a region; determining parcel data for the region; determining a final segmentation output based on the region image and parcel data using a trained segmentation module; optionally generating training data; and training a segmentation module using the training data S500.

21 Claims, 8 Drawing Sheets

(56) References Cited

U.S. PATENT DOCUMENTS

| | | | |
|---|---|---|---|
| 8,078,436 B2 | 12/2011 | Pershing et al. | |
| 8,081,841 B2 | 12/2011 | Schultz et al. | |
| 8,085,849 B1* | 12/2011 | Ratner | H04N 19/543 |
| | | | 375/240.16 |
| 8,145,578 B2 | 3/2012 | Pershing et al. | |
| 8,170,840 B2 | 5/2012 | Pershing | |
| 8,209,152 B2 | 6/2012 | Pershing | |
| 8,401,222 B2 | 3/2013 | Thornberry et al. | |
| 8,452,125 B2 | 5/2013 | Schultz et al. | |
| 8,515,125 B2 | 8/2013 | Thornberry et al. | |
| 8,531,472 B2 | 9/2013 | Freund et al. | |
| 8,542,880 B2 | 9/2013 | Thornberry et al. | |
| 8,660,382 B2 | 2/2014 | Schultz et al. | |
| 8,670,961 B2 | 3/2014 | Pershing et al. | |
| 8,731,234 B1 | 5/2014 | Ciarcia et al. | |
| 8,774,525 B2 | 7/2014 | Pershing | |
| 8,818,770 B2 | 8/2014 | Pershing | |
| 8,823,732 B2 | 9/2014 | Adams et al. | |
| 8,825,454 B2 | 9/2014 | Pershing | |
| 8,977,520 B2 | 3/2015 | Stephens et al. | |
| 8,995,757 B1 | 3/2015 | Ciarcia et al. | |
| 9,129,376 B2 | 9/2015 | Pershing | |
| 9,135,737 B2 | 9/2015 | Pershing | |
| 9,141,880 B2 | 9/2015 | Ciarcia | |
| 9,147,287 B2 | 9/2015 | Ciarcia | |
| 9,159,164 B2 | 10/2015 | Ciarcia | |
| 9,183,538 B2 | 11/2015 | Thornberry et al. | |
| 9,244,589 B2 | 1/2016 | Thornberry et al. | |
| 9,275,496 B2 | 3/2016 | Freund et al. | |
| 9,292,913 B2 | 3/2016 | Schultz et al. | |
| 9,329,749 B2 | 5/2016 | Thornberry et al. | |
| 9,437,029 B2 | 9/2016 | Schultz et al. | |
| 9,514,568 B2 | 12/2016 | Pershing et al. | |
| 9,520,000 B2 | 12/2016 | Freund et al. | |
| 9,542,738 B2 | 1/2017 | Schultz et al. | |
| 9,599,466 B2 | 3/2017 | Pershing | |
| 9,743,046 B2 | 8/2017 | Giuffrida et al. | |
| 9,753,950 B2 | 9/2017 | Schultz et al. | |
| 9,805,489 B2 | 10/2017 | Schultz et al. | |
| 9,836,882 B2 | 12/2017 | Freund et al. | |
| 9,911,228 B2 | 3/2018 | Pershing et al. | |
| 9,933,254 B2 | 4/2018 | Thornberry et al. | |
| 9,933,257 B2 | 4/2018 | Pershing | |
| 9,959,581 B2 | 5/2018 | Pershing | |
| 9,959,653 B2 | 5/2018 | Schultz et al. | |
| 9,972,126 B2 | 5/2018 | Freund et al. | |
| 10,197,391 B2 | 2/2019 | Thornberry et al. | |
| 10,229,532 B2 | 3/2019 | Freund et al. | |
| 10,338,222 B2 | 7/2019 | Schultz et al. | |
| 10,346,935 B2 | 7/2019 | Thornberry et al. | |
| 10,402,676 B2 | 9/2019 | Wang et al. | |
| 10,455,197 B2 | 10/2019 | Giuffrida et al. | |
| 10,489,953 B2 | 11/2019 | Schultz et al. | |
| 10,503,843 B2 | 12/2019 | Keane | |
| 10,515,414 B2 | 12/2019 | Pershing | |
| 10,528,960 B2 | 1/2020 | Pershing et al. | |
| 10,529,029 B2 | 1/2020 | Okazaki | |
| 10,571,575 B2 | 2/2020 | Schultz et al. | |
| 10,573,069 B2 | 2/2020 | Freund et al. | |
| 10,648,800 B2 | 5/2020 | Thornberry et al. | |
| 10,650,285 B1 | 5/2020 | Okazaki | |
| 10,663,294 B2 | 5/2020 | Pershing et al. | |
| 10,685,149 B2 | 6/2020 | Pershing | |
| 10,796,189 B2 | 10/2020 | Wang et al. | |
| 10,839,469 B2 | 11/2020 | Pershing | |
| 2004/0138817 A1 | 7/2004 | Zoken et al. | |
| 2005/0209781 A1 | 9/2005 | Anderson | |
| 2006/0041375 A1 | 2/2006 | Witmer et al. | |
| 2009/0222438 A1 | 9/2009 | Strandell et al. | |
| 2009/0296990 A1 | 12/2009 | Holland et al. | |
| 2010/0114537 A1* | 5/2010 | Pershing | G06T 7/593 |
| | | | 703/1 |
| 2012/0041722 A1 | 2/2012 | Quan et al. | |
| 2014/0094194 A1 | 4/2014 | Schwent et al. | |
| 2015/0022555 A1 | 1/2015 | Chau | |
| 2017/0076438 A1* | 3/2017 | Kottenstette | G06K 9/627 |
| 2019/0188516 A1 | 6/2019 | Porter et al. | |
| 2020/0134833 A1 | 4/2020 | Biswas et al. | |
| 2020/0160030 A1 | 5/2020 | Lavi | |
| 2021/0073449 A1* | 3/2021 | Segev | G06K 9/4604 |

OTHER PUBLICATIONS https://github.com/microsoft/USBuildingFootprints.

Jaeeun Lee, Machine Learning Classification of Buildings for Map Generalization, ISPRS Int. J. Geo—Inf. 2017, 6, 309; doi:10.3390/ijgi6100309.

Weijia Li et al. "Semantic Segmentation-Based Building Footprint Extraction Using Very High-Resolution Satellite Images and Multi-Source GIS Data", Remote Sens. 2019, 11, 403; doi:10.3390/rs11040403.

Qin, Yuchu, et al., "Semantic Segmentation of Building Roof in Dense Urban Environment with Deep Convolutional Neural Network: A Case Study Using GF2 VHR Imagery in China", Sensors, 2019, 19, 1164, www.mdpi.com/journal/sensors, pp. 1-12.

* cited by examiner

METHOD FOR PROPERTY FEATURE SEGMENTATION

CROSS-REFERENCE TO RELATED APPLICATIONS

This application claims the benefit of U.S. Provisional Application Ser. No. 63/033,757, filed on 2 Jun. 2020, which is incorporated in its entirety by this reference.

TECHNICAL FIELD

This invention relates generally to the computer vision field, and more specifically to a new and useful method for property feature instance-aware segmentation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
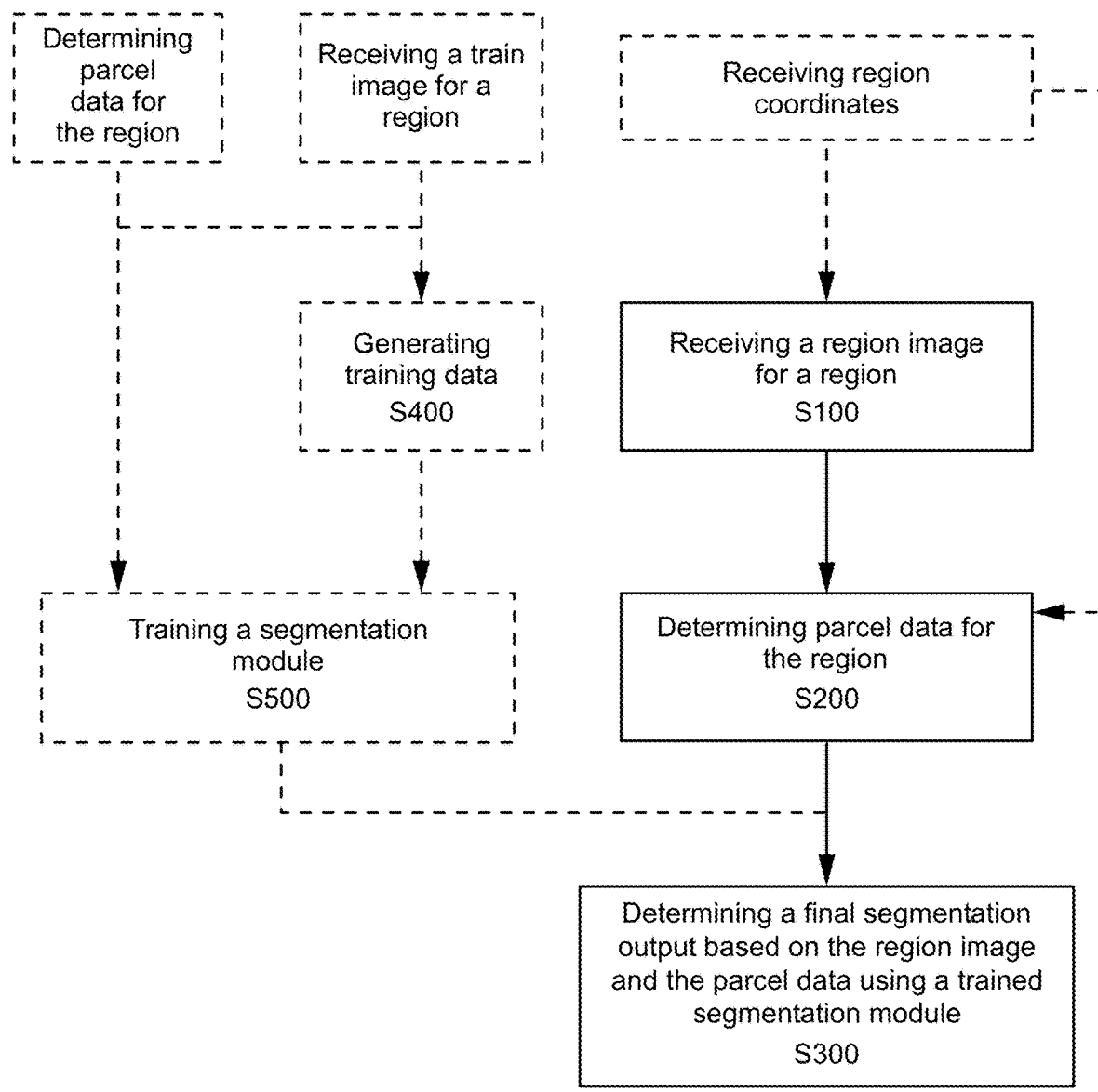
FIG. 1 is a schematic representation of the method.

As shown in FIG. 1, a method for determining property feature segmentation includes: receiving a region image for a region S100; determining parcel data for the region S200; determining a final segmentation output based on the region image and parcel data using a trained segmentation module S300; optionally generating training data S400; and training a segmentation module using the training data S500; and/or any other suitable elements.

The method functions to identify property feature instances within a region image (e.g., segment property features from an image). In variants, the property feature instances can be substantially pixel-accurate (e.g., accurate within a threshold tolerance). The method can additionally or alternatively generate training data for property feature segmentation from noisy labels.

A property feature 10 can include: structures (e.g., roofs, walls, pools, courts, etc.), paved surfaces (e.g., roads, parking lots, driveways, alleyways, etc.), vegetation (e.g., lawns, forests, gardens, etc.), waterfront (e.g., lake water front, ocean water front, canal water front, etc.), and/or any other suitable property feature. The property features can be associated with parcels, associated with private ownership, associated with public ownership (e.g., municipal property), and/or associated with any other suitable data.

2. Examples

In a first example, the method can include generating training data, wherein the training data includes region image and property feature instance training target pairs. Generating a property feature instance training target using a region image can include receiving a region image that represents a geographic region. A first worker can label the region image with a first set of property feature segment polygons (e.g., segments of property features represented by a polygon). A second worker can label the same region image to generate a second set of property feature segment polygons (e.g., wherein any number of workers can label the same region image to generate multiple sets of property feature segment polygons). Contiguous property feature segment polygons of the first set can be merged (or concatenated) to determine a first set of property feature instance polygons, and contiguous property feature segment polygons of the second set can be merged (or concatenated) to determine a second set of property feature instance polygons (e.g., contiguous property feature segment polygons belonging to the same parcel region can be concatenated within each set of property feature segment polygons). The first set of property feature instance polygons and the second set of property feature instance polygons can be used to generate the property feature instance training target (e.g., foreground map, exterior edge map, combined foreground and exterior edge map, etc.). In some embodiments, the property feature instance training target can include artificially imposed "air gaps" between adjacent property feature instances belonging to separate parcels (e.g., determined by combining the foreground map and the exterior edge map). Artificially imposed air gaps can cause the estimated property feature instances to be under segmented, which can be rectified by post-processing the instance-aware mask and combining the post-processed instance-aware mask with the semantic segmentation mask.

Figure 6:
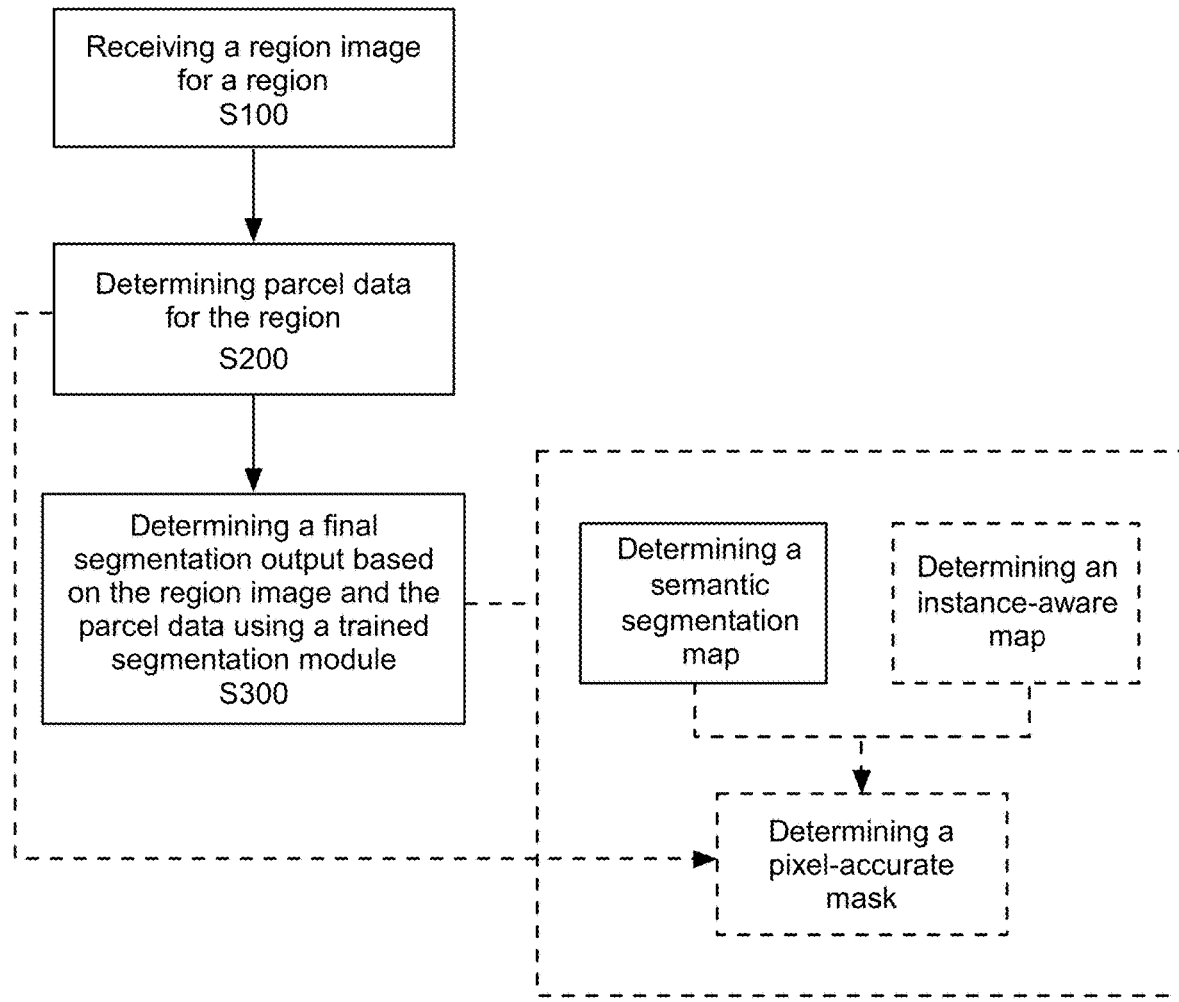
FIG. 6 depicts an embodiment of the method.

In a second example, during inference, the method can include: receiving a region image (e.g., retrieved based on an address or other input); determining parcel data associated with the region image; and determining a final segmentation output based on the region image and the parcel data using a trained segmentation module. As shown in FIG. 6, determining a final segmentation output can include: determining a semantic segmentation map; determining an instance-aware map; and determining a pixel-accurate mask, wherein the pixel-accurate mask can be determined based on the semantic segmentation map, the instance-aware map, and/or the parcel data.

3. Benefits

The method can confer several benefits over conventional methods.

First, the method is able to identify property feature instances even in cases where it would not be possible for a human to unambiguously distinguish property feature instances based on only RGB imagery.

Second, while property feature instance identification can be extremely beneficial for aerial image-based analyses, such as geocoding, building analyses (e.g., roof quality analyses), and other analyses, the inventors have discovered that labelers (e.g., manual labelers, segmentation algorithms) cannot reliably identify property feature instances (e.g., a property feature belonging to a single building) within aerial imagery for model training. However, the inventors have discovered that manual labelers can reliably identify region segments (e.g., visually consistent regions on a property feature).

This method converts identified property feature segment polygons (e.g., roof subsections, paved surface subsections, etc.) into property feature instances (e.g., roof instances or roof segments) for use in segmentation module training, which leverages the increased precision in manual labelling by simplifying the labelling task for workers while obtaining the data resolution needed for instance-aware property feature segmentation training.

The inventors have further discovered that merely merging contiguous property feature segment polygons into property feature instance polygons can be insufficient, since the merged property feature segments may represent one or more buildings (e.g., in dense developed environments). This method resolves this issue by using parcel data to distinguish whether a seemingly continuous property feature truly belongs to a single building or contiguous buildings (e.g., wherein different parcels are assumed to generally support different buildings, and/or different buildings are assumed to be supported by different parcels).

Third, variants of the method can achieve instance-aware segmentation using a standard segmentation module by training the segmentation module with tailored training data that includes artificially inserted air gaps between contiguous property feature instances. The air gaps can be weighted more heavily than background pixels during training to help the segmentation module (e.g., semantic segmentation model) separate property feature instances. Each property feature instance within the instance-aware mask can be labelled with a distinct property feature instance identifier to achieve instance-aware segmentation.

Fourth, variants of the method rectify the under-segmentation of property feature footprints encountered by conventional solutions. Under-segmentation of property feature footprints can be caused by property feature segment and/or property feature instance training targeting and air gap insertion. The inventors have discovered that under segmentation can be rectified by refining each property feature instance with the respective region segments. For example, each instance within the instance-aware segmentation output can be expanded until the map is flooded, then the flooded map can be masked with the semantic segmentation output to identify the property feature pixels. Since the airgaps imposed by instance-based segmentation can be of unknown pixel width (and/or unknown property feature provenance), this can generate more accurate pixel-property feature assignments, thereby resulting in more accurate property feature characterization.

4. System

Figure 2:
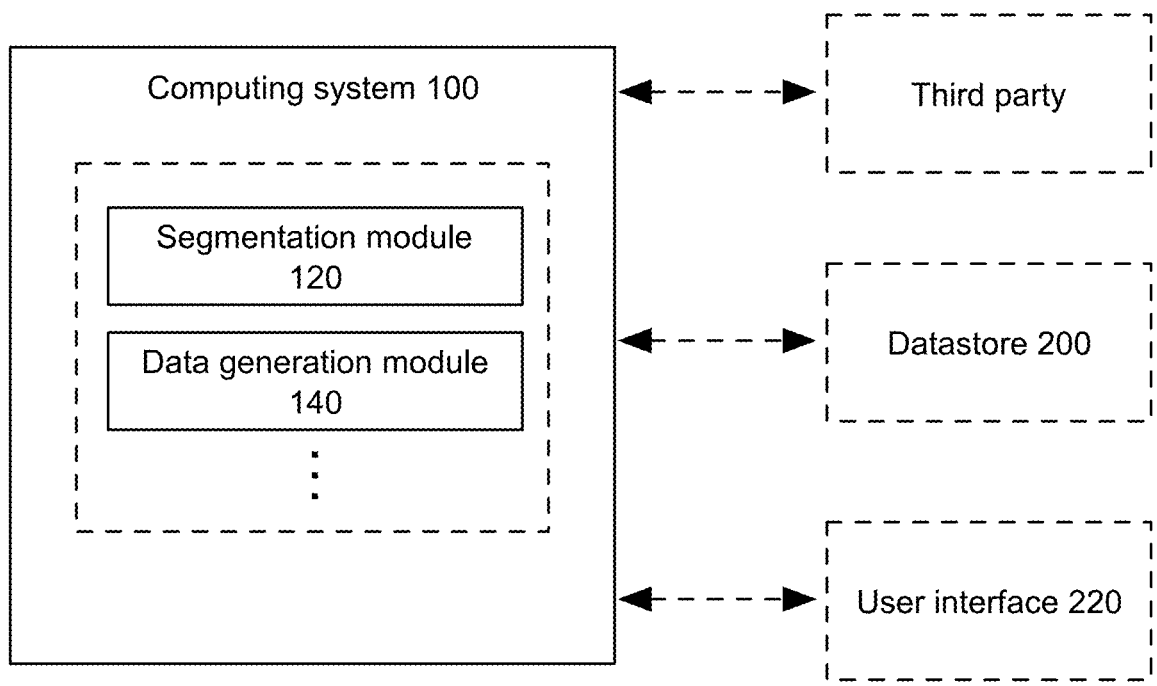
FIG. 2 is a schematic representation of the system.

As shown in FIG. 2, the system for determining property feature segmentation includes: a computing system 100, optionally a datastore 200, optionally a user interface 220; and/or any other suitable components.

The computing system 100 can include one or more modules. The modules can include: a segmentation module 120; an data generation module 140; and/or any other suitable module. The computing system can include a remote computing system (e.g. one or more servers), user device (e.g., smartphone, laptop, desktop, etc.), and/or other computing system. In some embodiments, the computing system can include a remote computing system and a user device that interfaces with the remote computing system via an API. In some embodiments, the computing system can include a remote computing system that interfaces with a third-party via an API.

The segmentation module 120 can function to perform one or more method processes. The segmentation module functions to: determine heatmaps, determine property feature instances, and/or perform other functionalities. The segmentation module can include the segmentation model, an object detector model, and/or any other suitable machine learning model that can be used to identify property features in images. The segmentation model is preferably a semantic segmentation model, such as a neural network, and can be trained based on training data. Additionally or alternatively, the segmentation model is an instance-based segmentation model, a classifier, and/or any other segmentation model. The neural network can be a CNN, a feed forward network, a transformer network, and/or any other suitable network. The neural network can have a U-net architecture (e.g., with an encoder and decoder), a ResNet, and/or any other suitable architecture. The segmentation model can be a binary classifier (e.g., property feature vs background), a multi-class classifier (e.g., different types of structures vs background), an object detector, and/or any other suitable classifier, but can additionally or alternatively leverage classical segmentation methods (e.g., gray level segmentation, conditional random fields, etc.) and/or other methods. During inference, the method can: use the same trained segmentation model in all contexts, selectively use the trained segmentation model based on the location context, and/or otherwise use the trained segmentation model. Examples of location context include: location information (e.g., city, neighborhood, street, etc.); zoning; developed environment class (e.g., urban, suburban, rural, exurban, etc.); average distance between buildings (e.g., determined based on the parcel data); and/or other contextual parameters. However, the segmentation module can be otherwise defined.

The data generation module 140 can function to generate training data for the segmentation module. The data generation module can include: a training target inference algorithm, rule sets, heuristics, and/or any other suitable algorithm. The data generation module can determine the property feature instance training target, the property feature instance polygons, the property feature segment polygons, and/or any other suitable information. However, the data generation module can be otherwise defined.

The datastore 200 can function to store data, imagery, updated imagery, extracted property feature polygons, and/or any other suitable information. The data can include: addresses, parcel data (e.g., parcel polygons or boundaries, parcel masks, parcel descriptions, parcel images, building descriptions, expected built structure classes, expected building number, etc.), image features, built structure class labels (e.g., per segment, per parcel image, per parcel polygon, etc.), building geolocation, imagery (with geographic identifiers), and/or any other suitable data. However, the datastore can be otherwise defined. The data discussed above can additionally or alternatively be received from a third party database (e.g., via an API, periodically sent, etc.), or otherwise obtained.

The user interface 220 can function to display a region image and receive information (e.g., region segment labels) from a user that can be used by the data generation module. The information can include one or more sets of region segment labels (e.g., region segment votes), property feature polygons and/or any other suitable information. However, the user interface can be otherwise defined.

4. Method

The method for determining property feature segmentation can include: receiving a region image for a region S100, determining parcel data for the region S200, determining a final segmentation output based on the region image and parcel data using a trained segmentation module S300;

optionally generating training data S400; optionally training a segmentation module using the training data S500; and/or any other suitable elements.

The method is preferably performed by the system discussed above, but can alternatively be performed using any other suitable system. The method can be executed by one or more computing systems.

The method can be used with one or more region images 20, which can be used by the method to perform inference, and/or as a train image to generate training data and train the segmentation module. The region images can be aerial imagery (remote imagery, such as imagery taken of a remote scene) (e.g., satellite imagery, balloon imagery, drone imagery, etc.), be imagery crowdsourced for a geographic region, or other imagery. The region images can depict a geographic region larger than a predetermined area threshold (e.g., average parcel area, manually determined region, image-provider-determined region, etc.), a large-geographic-extent (e.g., multiple acres that can be assigned or unassigned to a parcel), encompass one or more parcels (e.g., depict a set of parcels), encompass a set of property features (e.g., depict a plurality of property features within the geographic region), and/or any other suitable geographic region. The region images are preferably top-down plan views of the region (e.g., nadir images, panoptic images, etc.), but can additionally or alternatively include elevation views (e.g., street view imagery) and/or other views. The region images are preferably 2D, but can alternatively be 3D (e.g., wherein each pixel can be associated with a depth value). The region images can be associated with depth information, terrain information, and/or any other information or data. The region images can be red-green-blue (RGB), hyperspectral, multispectral, black and white, IR, NIR, UV, thermal, and/or captured using any other suitable wavelength. The region images are preferably orthorectified, but can be otherwise processed. The region images can additionally or alternatively include any other suitable characteristics.

The region images can be associated with geographic data; time data (e.g., recurrent time, unique timestamp); and/or other data. The region images are preferably pixel-aligned with geographic coordinates (e.g., georeferenced; each pixel can be associated with a known geographic coordinate, etc.), but can be offset, aligned within a threshold margin of error, or otherwise aligned. Examples of geographic data can include: a geolocation (e.g., of an image centroid, such as geographic coordinates); a geographic extent (e.g., area, range of geographic coordinates, etc.); municipal labels (e.g., set of addresses, a set of parcel identifiers or APNs, counties, neighborhoods, cities, etc.); and/or other geographic data.

A region image can include (e.g., depict): individual property feature instances on a parcel (e.g., single family homes, lawns, roads, etc.); multiple separate property features belonging to separate buildings on a parcel (e.g., primary residence, secondary residence, garage, shed, etc.); multiple connected property features that span multiple parcels but appear to belong to the same building (e.g., row houses, lawns, roads, etc.); and/or any other property feature configuration.

The method can be used with parcel data 30. The parcel data can be representative of one or more parcels (e.g., land lots, plots belonging to different owners, etc.), private/public land delineation, road map, park map, and/or other set of geographic boundaries (e.g., delineating ownership distinctions). A parcel can be: a land parcel, cadastral parcel, extent of real property, land lot, tract, and/or other geographic region. The parcel data is preferably aligned with the region image (e.g., pixel-aligned, geographically aligned, georeferenced, etc.), but can be otherwise related to the region image. The parcel data can include: parcel boundary masks (e.g., one or more polygons that depict parcel edges, wherein the polygon boundary pixels can lie inside, outside, or span the actual parcel edge), parcel foreground masks (e.g., that depict the parcel interiors), structure descriptions (e.g., construction, square footage, property feature type, general location on the parcel, general shape, etc.), number of structures, expected structure labels, and/or other data. The parcel data can be noisy (e.g., spatial shift, low resolution, missing data, etc.) or accurate. The parcel data can be pixel accurate within a threshold, but need not be pixel accurate. The parcel data can be extracted from county records, permits, assessors, real estate information, and/or collected from any other suitable data source.

The method can be used with property feature segment polygons 40, which can represent segments of property features (e.g., partial roof segments, partial pavement segments, etc.). The property feature segment polygons can be determined per region image and/or per parcel. The property feature segment polygons can be determined by a manual labeler, automatically, and/or otherwise determined. Multiple property feature segment polygons can be determined by the same manual labeler for a particular region image or parcel. Multiple labelers can determine property feature segment polygons for the same image or parcel. A property feature segment polygon is preferably part of a property feature that, based on only RGB imagery, is clearly identified as a component of a property feature (e.g., a primary structure, a secondary structure, a part of the primary property feature covered with different material, section of paved surface, section of vegetation, etc.). A property feature segment polygon can define the area and/or edges of any visually consistent region of a property feature (e.g., a balcony, attached structure, HVAC, etc.). Visually consistent regions can include substantially contiguous built structure region, visually separated from other region segments by a gap or an edge. Additionally or alternatively, a property feature segment polygon can define the edges of the property feature, edges of one or more adjacent property features, and/or define any other suitable edges. However, the property feature segment polygon can be otherwise determined.

The method can be used with property feature instance polygons 50, which can represent a property feature instance. The property feature instance polygon can be determined from one or more property feature segment polygons, preferably from the same labeler (e.g., in a manual labelling session, in an automatic labelling session, etc.), but can additionally or alternatively be from different labelers, and/or otherwise determined. The property feature instance polygon can be represented by a binary mask, heatmap (e.g., values between 0-1), a class label (and/or set of labels, each with a classification probability), and/or any other suitable representation that depicts the property feature instance polygon in the region image.

A property feature instance polygon is preferably representative of a contiguous property feature belonging to a single parcel and/or region image. A property feature instance polygon can include a group of connected property feature segments (e.g., contiguous property feature segments, property feature segments separated by less than a threshold pixel or geographic distance, etc.) within a parcel and/or a train image. A property feature instance polygon can include merged adjacent visually consistent property feature segment polygons of a property feature belonging to a particular parcel or not belonging to a particular parcel (e.g., when parcel data is not available). The property feature instance polygon can encompass one or more property feature segment polygons, or not encompass property feature segment polygons (e.g., directly labelled from the region image).

Figure 5:
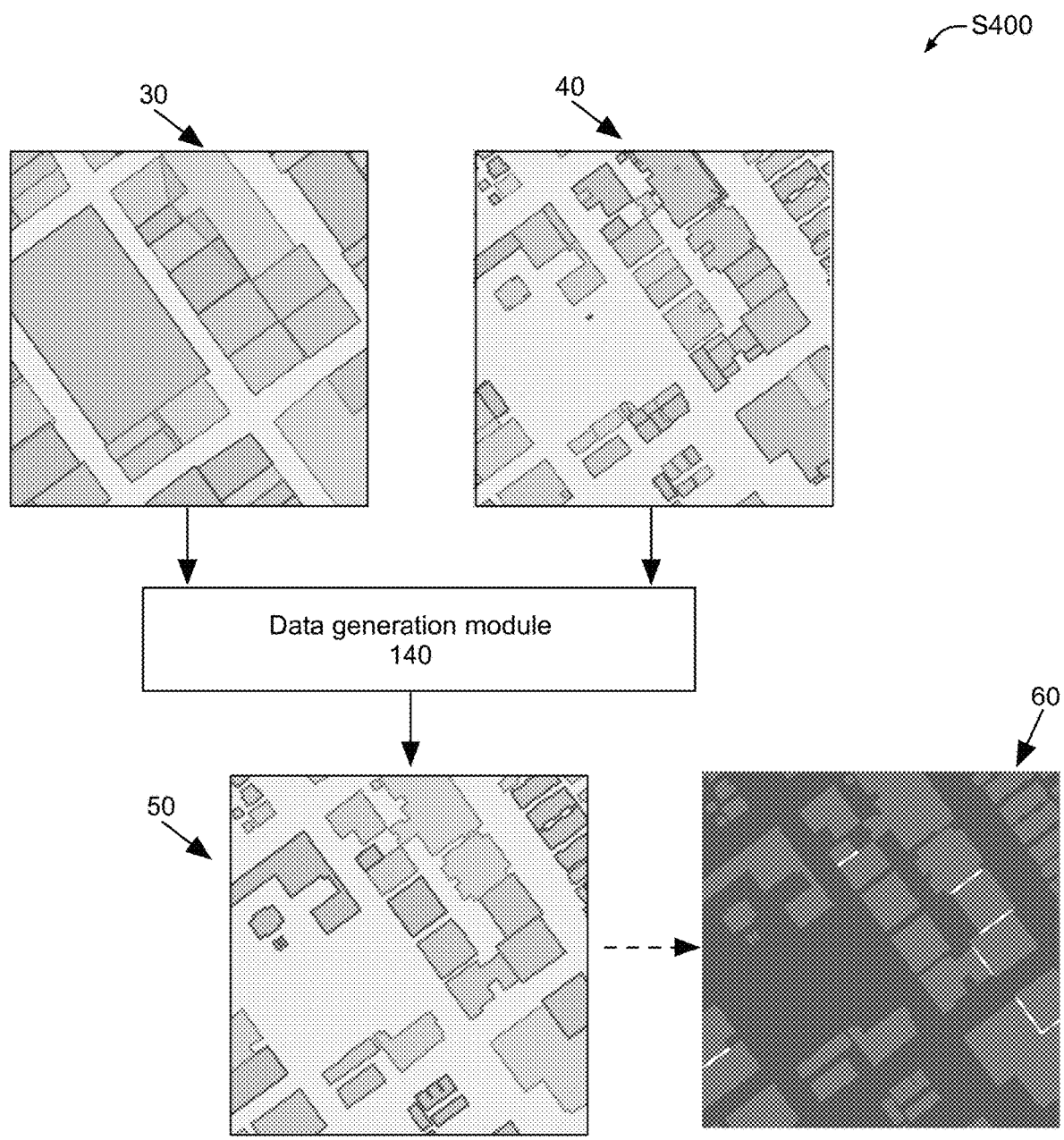
FIG. 5 depicts an embodiment of S400.

The method can be used with a property feature instance training target 60 per train image which can include an indication for property feature or not property feature. The indication can be represented by a property feature instance identifier (e.g., locally unique index, parcel number, randomly assigned number, geolocation, etc.), heatmap (e.g., values between 0-1), a binary mask, percentage value mask (e.g., values between 0-100), and/or otherwise represented. The property feature instance training target can optionally include a property feature instance polygon, set of points, or other geometric representation indicative of the property feature instance boundaries. The property feature instance training target is preferably determined based on the property feature instance polygons of the train image. An example of the property feature instance training target is depicted in FIG. 5.

In variants, the property feature instance training target can include a foreground map 62 and an exterior edge map 64 that depict the property feature instance polygons in the train image. The foreground map can depict property feature instance polygon interiors. The foreground map is preferably a heatmap (e.g., values between 0-1), but can additionally or alternatively be a mask, or other suitable representation. The exterior edge map can represent property feature instance polygon exterior edges with a predetermined thickness, wherein the predetermined thickness can be equivalent to a predetermined physical distance (e.g., ½ m; determined based on the geographic area represented by a pixel or other unit; etc.). The exterior edge map is preferably a heatmap (e.g., values between 0-1), but can additionally or alternatively be a mask, or other suitable representation.

The property feature instance training target can be weighted based on the property feature instance polygons and the parcel data. For example, pixels associated with inserted air gaps between property feature instance polygons can be weighted more than pixels associated with property feature instance polygons or pixels not associated with property feature instance polygons. An example of the property feature instance training target is depicted in FIG. 5. However, the property feature instance training target can be otherwise defined.

The method can be used with a final segmentation output 70 (e.g., individual property feature instances). The final segmentation output can be the output by the segmentation module, such as the instance-aware mask 72, the semantic segmentation mask 74; the output from post-processing the output of the segmentation module, such as the pixel-accurate mask 82; and/or any other suitable mask.

4.1 Receiving a Region Image for a Region S100.

Receiving a region image for a region S100 can function to provide the image for property feature identification (e.g., property feature segmentation). The region image can be: retrieved from a database (e.g., local database, third party database, etc.), received from an image provider, and/or otherwise received. The region image can be retrieved based on a geographic descriptor and/or other information. The geographic descriptor can be: automatically determined by a segmentation system, received from a user (e.g., determined from an address etc.), and/or otherwise determined.

The geographic descriptor can include: a geographic coordinate (e.g., determined using conventional geocoding methods), a parcel identifier, a municipal identifier (e.g., determined based on the ZIP, ZIP+4, city, state, etc.), or other descriptor.

However, the region image can be otherwise received.

4.2 Determining Parcel Data for the Region S200.

Determining parcel data for the region can function to determine parcel boundaries for the parcels depicted in the region image. Determining the parcel data can include retrieving parcel data from a third-party API, periodically downloading parcel data from the third party, querying a datastore for parcel data, and/or otherwise receiving parcel data. The parcel data can be determined in response to a user query; when an associated region image is going to be used to generate training data; when an associated region image is going to be otherwise processed by the method; and/or at any other suitable time. The parcel data preferably represents parcel boundaries for parcels depicted in a region image, but can additionally or alternatively represent city boundaries, or any other suitable boundary in the region image.

In variants, external data (e.g., county records, permits, assessors, real estate information, and/or any other suitable data source) can be downloaded periodically and the parcel data can be extracted from the external data. Additionally or alternatively, the parcel data for the region image can be otherwise determined.

However, the parcel data can be otherwise determined.

4.3 Determining a Final Segmentation Output Based on the Region Image and Parcel Data Using a Trained Segmentation Module S300.

Determining a final segmentation output based on the region image and parcel data using a trained segmentation module S300 can function to generate pixel-accurate segmentation of a region image. S300 is preferably performed using the trained segmentation module from S500, but can additionally or alternatively be performed using an external segmentation module, such as from a third-party datastore.

The final segmentation output can be a heatmap, a mask, bounding polygons (e.g., boxes, triangles, pentagons, or any other polygon), and/or otherwise represented. The final segmentation output can be pixel-accurate (e.g., each pixel of the region image is accurately labeled; little or no segment boundary error is present; exclude boundary lines between property feature instances; etc.), but can alternatively include boundary lines or be otherwise characterized.

S300 can include: generating one or more segmentation outputs using the trained segmentation module, optionally removing outlier property feature instances in the one or more segmentation outputs, post-processing the one or more segmentation outputs, and determining polygons from the post-processed segmentation outputs, and/or any other suitable elements.

Generating the one or more segmentation outputs can include generating a semantic segmentation mask, an instance-aware mask, and/or any other suitable masks. The segmentation outputs are preferably generated from the same region image, but can additionally or alternatively be generated from different region images.

In a first variant, the semantic segmentation mask can be generated from a first channel of the trained segmentation module and the instance-aware mask can be generated from a second channel of the trained segmentation module (e.g., the same model). However, the masks can be otherwise generated by the trained segmentation module.

In a second variant, generating the one or more segmentation outputs can include using different segmentation modules (e.g., different segmentation algorithms, such as different neural networks) to generate the semantic segmentation mask and the instance-aware mask, wherein the semantic segmentation mask and the instance-aware mask are pixel-aligned.

In a third variant, generating the one or more segmentation outputs can include generating only the semantic segmentation mask using a single channel of the trained segmentation module.

However, the segmentation outputs can be otherwise generated.

Removing outlier property feature instances in the one or more segmentation outputs can function to reduce noise in the segmentation outputs. In a first variant, removing outlier property features can include removing property features less than a predetermined threshold size (e.g., inaccurately identified as property features). The predetermined threshold can be 10 pixels, 20 pixels, 30 pixels, 40 pixels, 50 pixels, and/or any other suitable size. However, the outlier property feature instances can be otherwise identified and processed.

Post-processing the one or more segmentation outputs (e.g., instance-aware mask, semantic segmentation mask, etc.) can function to determine a pixel-accurate version of the one or more segmentation outputs (e.g., to correct under segmentation of property features). Post-processing the one or more segmentation outputs can include re-labelling pixels in the segmentation outputs using assigned instance identifiers 76.

In a first variant, re-labelling pixels in the segmentation outputs can include performing space-filling to more accurately identify property feature pixels and background pixels, which can be performed by computing a distance transform 78 using the instance-aware mask; assigning instance identifiers to pixels of the instance-aware mask based on the distance transform 78 (e.g., using the watershed technique, heuristics, etc.); and generating a pixel-accurate mask by combining the instance-aware mask, instance identifiers, and the semantic segmentation mask.

In a second variant, re-labelling pixels in the segmentation outputs can include: masking the semantic segmentation mask with the parcel data (e.g., parcel mask) and assigning each masked segment a unique instance identifier to generate the pixel-accurate mask.

However, the segmentation outputs can be otherwise post-processed.

Determining polygons from the post-processed segmentation outputs can include: optionally enlarging the one or more segmentation outputs by a predetermined amount (e.g., by a factor of 2, 3, 4, 5, etc.); extracting polygons from the one or more segmentation outputs and/or from the pixel accurate mask; and storing the extracted polygons in a datastore, or not storing the extracted polygons. In variants, determining the polygons can be performed by iterating through each instance identifier, extracting the polygon for the instance identifier (e.g., all pixels assigned the instance identifier); and optionally reducing the number of vertices of the extracted polygon to a predetermined number of vertices (e.g., 3, 4, 5, 6, etc.).

Figure 7:
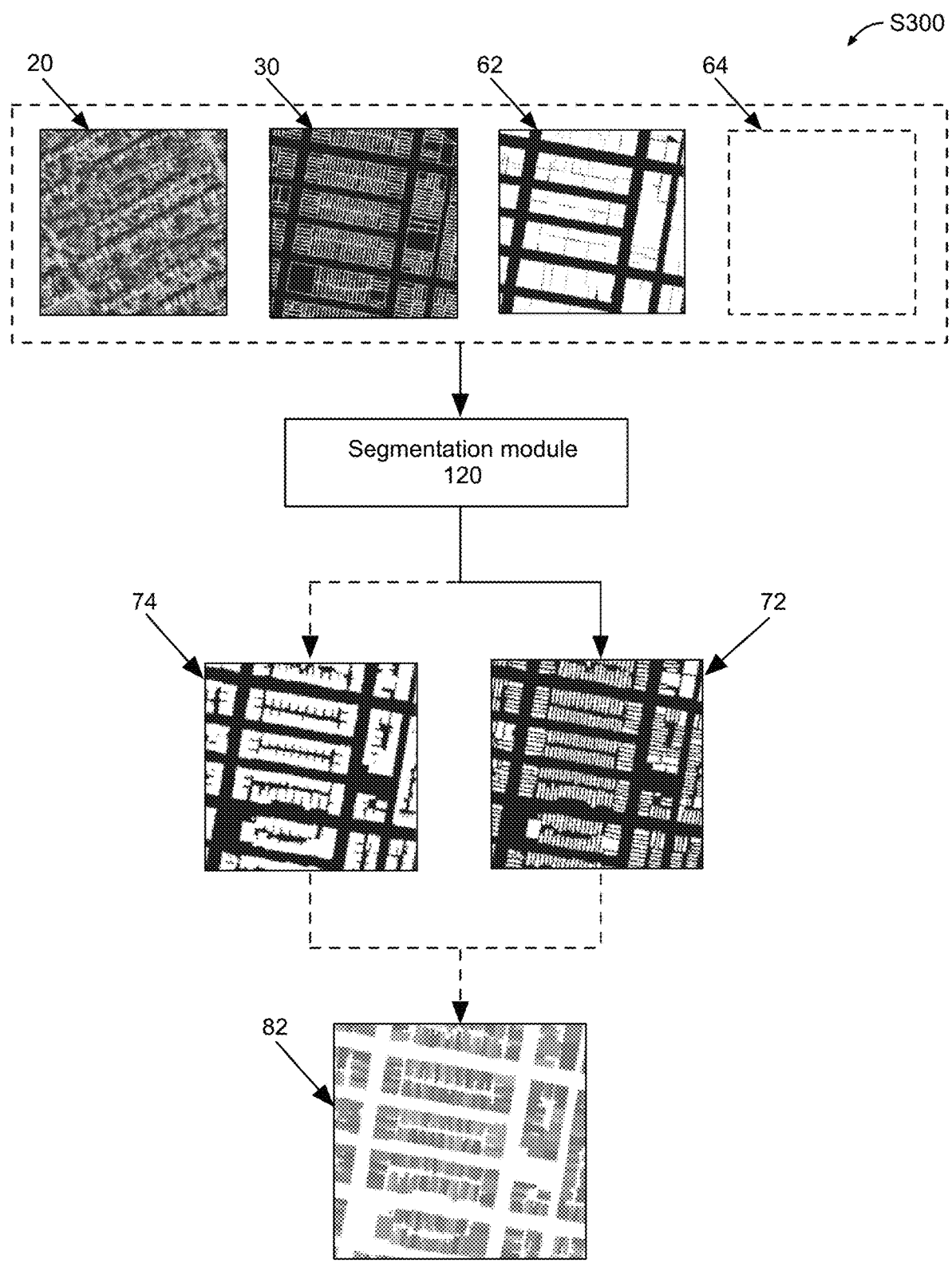
FIG. 7 depicts an example of S300.

In a first variant, the trained segmentation module can determine an instance-aware parcel-aware segmentation heatmap based on the region image and parcel data. The instance-aware parcel-aware segmentation heatmap can be processed (e.g., using thresholding techniques) to determine an instance-aware, parcel-aware segmentation mask. The parcel data can include the parcel boundaries, the parcel foreground area, and/or other parcel data. Each estimated instance of the instance-aware parcel-aware segmentation mask (e.g., each pixel of an estimated instance) can be assigned an instance identifier, such as to distinguish between estimated property feature instances. The final segmentation output can include the instance-aware parcel-aware segmentation mask and the associated instance identifiers. A specific example is depicted in FIG. 7. In particular, FIG. 7 depicts a region image (e.g., RGB image) where determining whether particular property feature segments belong to the same property feature instance or different property feature instances without additional information (e.g., parcel data) would be challenging for a human labeler. Specifically, FIG. 7 depicts an example where property feature segment polygons that belong to the same parcel are classified as the same property feature instance by the segmentation module, whereas property feature segment polygons that belong to different parcels are classified as different property feature instances.

In a second variant, the final segmentation output can be generated by the trained segmentation module directly. In this variant, the trained segmentation module generates a pixel-accurate mask that distinguishes between different property feature instances. In this variant, the trained segmentation module can be trained using a pixel-accurate target (e.g., generated using the post-processing method discussed above), the source image, and/or the parcel data, but can additionally or alternatively be trained using any other suitable training data.

In a third variant, the final segmentation output can be determined by post-processing the output of the segmentation module to determine the pixel-accurate mask.

Figure 8:
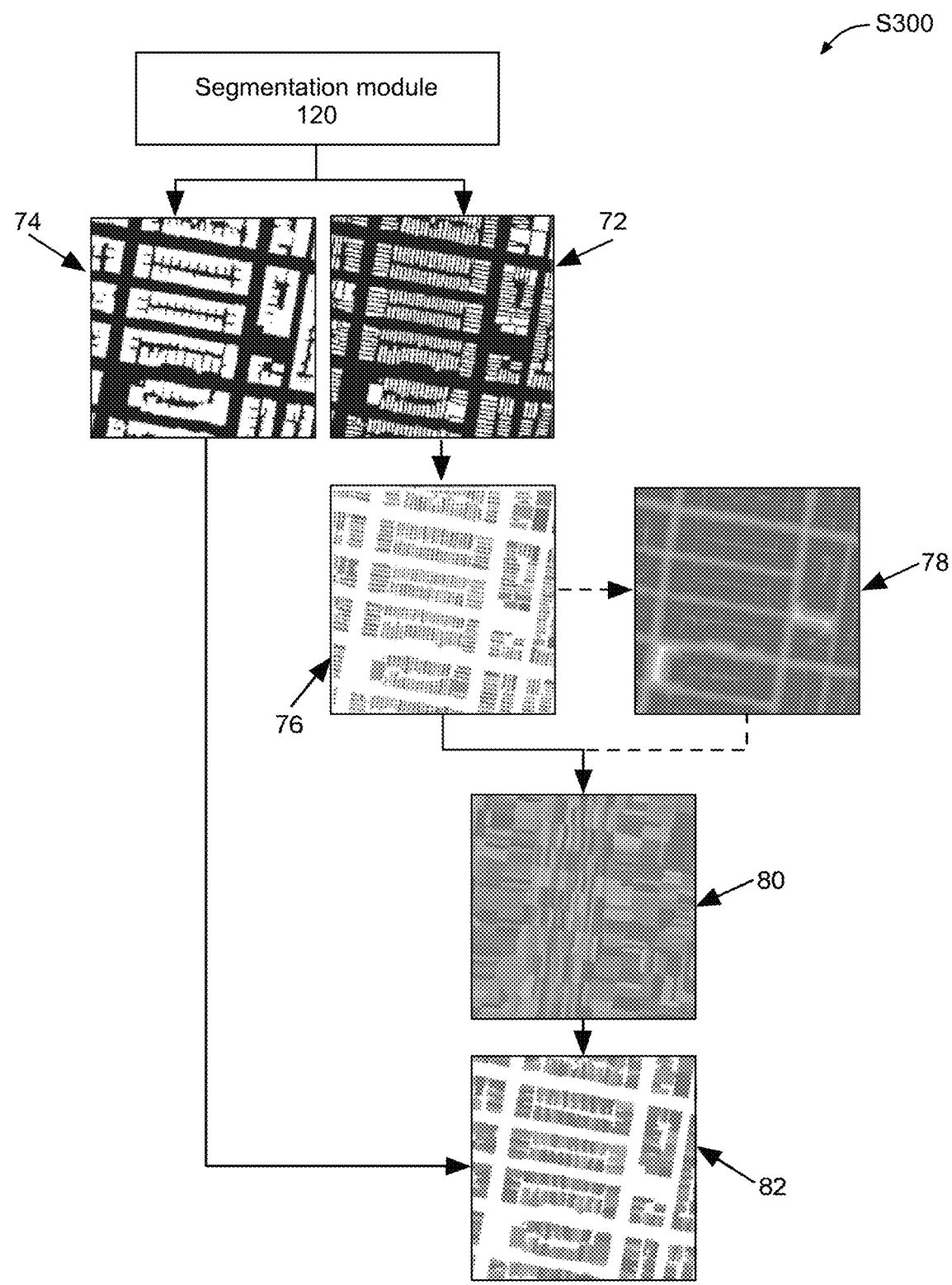
FIG. 8 depicts an example of S300.

In the third variant, the outputs of the segmentation module can be an instance-aware mask and a semantic segmentation mask that are generated based on the region image, parcel data, and optionally the foreground map and/or exterior edge map associated with the region image. A specific example is depicted in FIG. 8.

In the third variant, post-processing the output of the segmentation module can include: assigning instance identifiers to each estimated property feature instance of the instance-aware mask, such as to distinguish between estimated property feature instances; propagating each property feature instance's instance identifier to the property feature instance's pixels; determining a dense map 80 based on the individual property feature instances; and determining the final segmentation mask (e.g., pixel-accurate mask). A specific example is depicted in FIG. 8.

In the third variant, determining the dense map 80 based on the individual property feature instances can function to assign instance identifiers of the closest estimated property feature instance to unassigned pixels (e.g., air gaps and background). The dense map 80 is thus a map where each pixel is assigned an instance identifier. Assigning the unassigned pixels an instance identifier can be performed using a space filling technique (e.g., applying the watershed transform technique to the distance transform 78, propagating each property feature instance's instance identifier to unassigned neighboring pixels, etc.).

In a first embodiment, determining the dense map 80 can include computing a distance transform 78 and determining the dense map 80 based on the distance transform 78. Computing the distance transform 78 can include: for each unassigned pixel, using the parcel-aware mask to compute the distance to the nearest property feature instance (e.g., determined based on pixels associated with an instance identifier). The distance transform 78 can be a mask where pixels already assigned to a property feature instance are labelled 0 and unassigned pixels are labelled with a value corresponding to the distance to the nearest property feature instance (e.g., pixels farther from a property feature instance are labelled with larger distances). The distance transform 78 can additionally or alternatively be otherwise represented.

In a second embodiment, determining the dense map 80 can include assigning unassigned pixels an instance identifier by dilating each estimated property feature instance by a predetermined amount (e.g., uniformly), at a predetermined rate (e.g., at same rate), based on the respective instance sizes, based on the respective pixel's distance to an instance, or otherwise dilating each property feature instance. The property feature instances can be dilated until: all unassigned pixels are associated with an estimated property feature instance, until adjacent instances touch (e.g., along the entirety of the intervening boundaries), and/or another condition is met.

In the third variant, determining the final segmentation mask (e.g., pixel-accurate mask) can include removing the instance identifier labels from the pixels that are not associated with property feature instances of the dense map 80 by masking the dense map 80 with the semantic segmentation mask. The pixel-accurate mask can be represented by property feature pixels assigned an instance identifier and all other pixels can be labelled 0, but the pixel-accurate mask can be otherwise represented.

However, the final segmentation output can be otherwise determined.

4.4 Generating Training Data S400.

Figure 3:
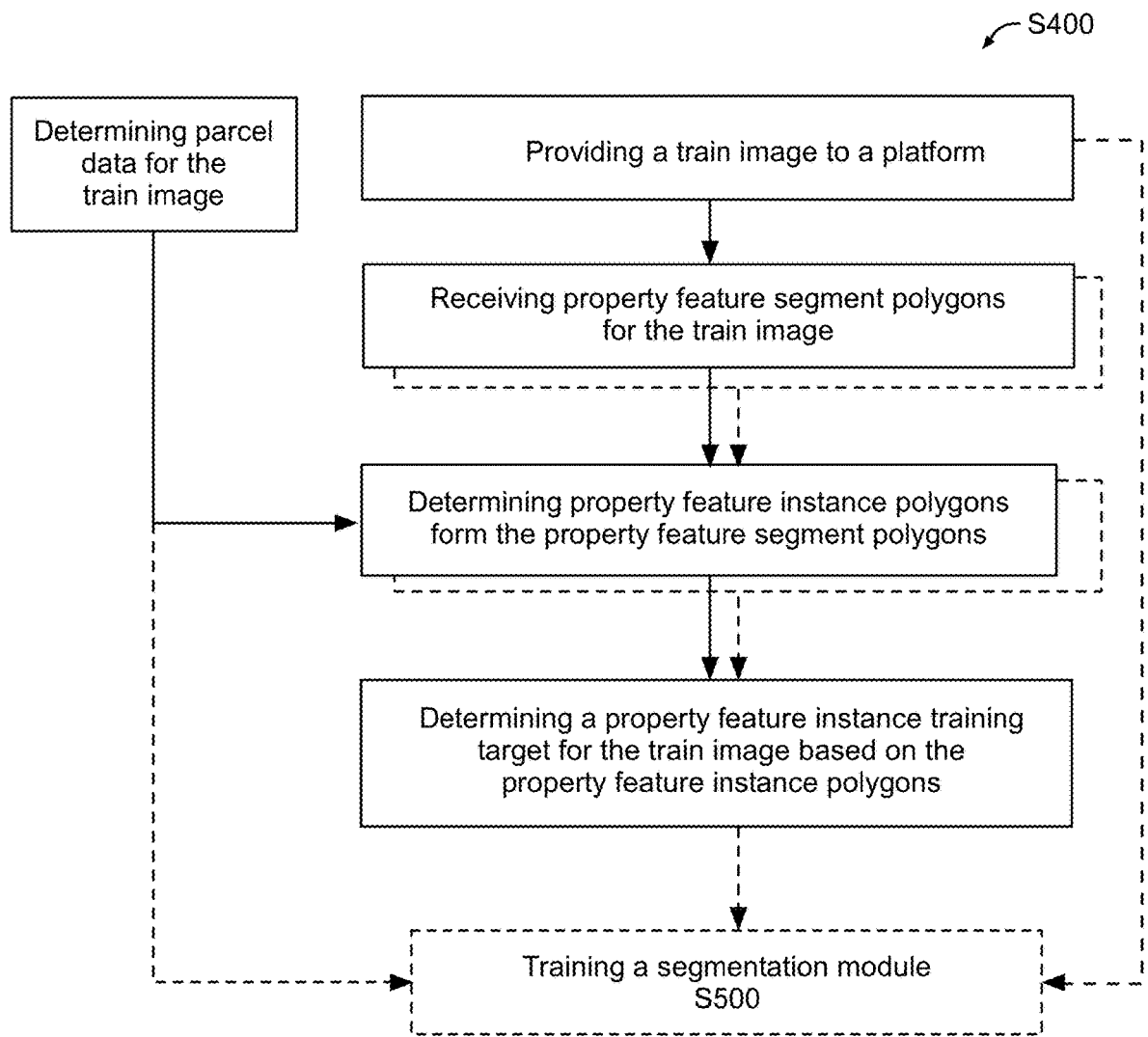
FIG. 3 depicts an embodiment of S400 and S500.

Generating training data can function to generate labels for train images that can be used to train the segmentation module. The train image is preferably a region image as described above (e.g., in S100), but can be any other suitable image of an area of interest. For each train image, generating training data can include (e.g., FIG. 3): providing a train image to a platform; receiving multiple property feature segment polygons for the train image (e.g., from multiple labelers); determining parcel data for the train image (e.g., using S200); determining property feature instance polygons from the property feature segment polygons; determining a property feature instance training target for the train image based on the property feature instance polygons; and/or any other suitable elements.

Providing the train image to a platform can function to provide a train image to a labeler (e.g., manual label; automatic labeler; such as a machine learning algorithm, etc.) that has access to a platform, wherein the platform can be a web application and/or any other suitable platform. The train image can be used by the labeler to identify a property feature segment polygons (e.g., polygons that represent segments of one or more property features). The train image can be transmitted to the labeler and/or otherwise provided to the labeler. The train image can be displayed on a user interface, and/or otherwise provided to the labeler. However, providing the train image can include any other suitable elements.

Receiving multiple property feature segment polygons for the train image can function to determine property feature segment polygons for a train image. Preferably, multiple different sets of property feature segment polygons can be received for the train image (e.g., from different labelers, from the same labeler, etc.), but additionally or alternatively, a single set of property feature segment polygons can be received for the train image. The property feature segment polygons are preferably determined at the granularity of segments of particular property features (e.g., wherein multiple segments can be merged to determine a property feature instance polygon), but can additionally or alternatively be determined at the granularity of property feature instances, or any other granularity.

In a first variant, property feature segment polygons can be determined using an API to interface with a third-party for manual worker labelling (e.g., worker labelling session). In a first embodiment, workers are instructed to segment property features at the granularity of property feature segments that can be discerned by the human eye without any additional information other than the train image. In a second embodiment, workers are instructed to segment property features at the granularity of property feature instances (e.g., all visually consistent adjacent units on a property feature are labelled as a property feature instance) that can be discerned by the human eye without any additional information other than the train image. In a third embodiment, workers are instructed to segment property features at the granularity of property feature instances per parcel based on parcel data overlaid on the train image. However, the property feature segments can be otherwise manually identified.

In a second variant, property feature segment polygons can be determined by automatically segmenting the train image. The train image can be segmented using one or more segmentation algorithms (e.g., neural networks, such as CNN based algorithms, thresholding algorithms, clustering algorithms, etc.), object detection algorithms (e.g., CNN based algorithms, such as Region-CNN, fast RCNN, faster R-CNN, YOLO, SSD-Single Shot MultiBox Detector, R-FCN, etc.; feed forward networks, transformer networks, and/or other neural network algorithms), and/or any other machine learning algorithm. The machine learning algorithms can optionally be trained based on other predetermined train images and associated final sets of property feature segment votes or instance votes, trained based on a related domain (e.g., box detector, shape detector, etc.); and/or be otherwise trained.

However, the property feature segment polygons can be otherwise determined.

Determining property feature instance polygons from the property feature segment polygons can function to determine boundaries of property feature instances in a train image. The property feature instance polygons can be determined by the data generation module, and/or by any other suitable module. A set of property feature instance polygons are preferably determined from an individual set of property feature segment polygons (e.g., wherein each set of property feature segment polygons generates a set of property feature instance polygons), but can alternatively be determined from multiple sets of set of property feature segment polygons or otherwise determined. Determining property feature instance polygons can include merging contiguous segment polygons, wherein the merged segment polygons define a property feature instance polygon; and optionally segmenting the merged region segments based on parcel data (e.g., parcel boundaries). The segment polygons can optionally be merged based on the parcel data (e.g., in which case they would not need to be segmented after merging contiguous segment polygons). Merging the contiguous segment polygons can be performed based on segment polygon adjacency, based on a separation distance between segmentation polygons falling below a threshold distance, and/or based on any other criteria. Examples of merge criteria can include: merging if all segments belong to the same parcel; merging if all segment polygons are connected (e.g., such as determined based on a transitive closure and/or transitive chain, such as A is connected to B which is connected to C);

merging segment polygons separated by less than a threshold geographical distance and/or number of pixels (e.g., ½ m, ¾ m, 1 px, 10 px, etc.); and/or any other suitable merge criteria. For example, adjacent region segments (e.g., separated by less than a threshold number of pixels) that are within the same parcel can be merged into a unitary property feature instance polygon. Merging the contiguous segment polygons can be performed by dilating the segment polygons, re-drawing the polygon boundary, and/or otherwise merging the segment polygons. Property feature segment polygons are preferably merged if they are determined by the same labeler, but can additionally or alternatively be merged if they are from different labelers, or otherwise merged.

In a first variant, multiple different sets of property feature instance polygons are determined by merging property feature segment polygons associated with specific labelers.

In a second variant, a single set of property feature instance polygons are determined by merging property feature segment polygons associated with one labeler and/or associated with the train image (e.g., from one or more labelers).

In a third variant, property feature instance polygons can be determined by: assigning each of the plurality of property feature segment polygons to a parcel (e.g., based on parcel data and/or heuristics); merging contiguous property feature segment polygons assigned to the same parcel into a single property feature instance polygon; and repeating the above processes for all parcels depicted in the train image. The property feature segment polygons can be assigned to a parcel by taking the union of region segments (or a dilated version thereof) and each parcel boundary mask from the parcel data, and assigning the region segment to the parcel with the largest overlap; or otherwise assigned. The contiguous property feature segment polygons can be identified by identifying adjacent property feature segment polygons separated by less than a threshold separation distance (e.g., ½ m, ¾ m, 1 px, 10 px, etc.), or otherwise identified. The threshold separation distance can be predetermined, determined based on the bounding edge drawn by a labeler, and/or otherwise determined. The contiguous property feature segment polygons can be merged by: determining an instance edge boundary that includes the identified property feature segment polygons; merging the property feature segment polygon blobs into a single continuous blob and determining the boundary of the continuous blob; and/or otherwise merged.

In a first example of the third variation, determining the property feature instance polygons can include assigning property feature segment polygons to parcels (e.g., based on property feature segment polygon overlap with a particular parcel, such as by determining the intersection of the property feature segment polygon and the parcel); identifying adjacent property feature segment polygon by computing an adjacency matrix; and merging connected property feature segment polygon based on the adjacency matrix. The adjacency matrix preferably determines groups of connected property feature segment polygons that form a transitive closure and are restricted to a parcel, but can determine any other suitable information.

In a second example of the third variation, determining the property feature instance polygons can include: dilating all (or a subset thereof) property feature segment polygons (e.g., by a predetermined amount, along a predetermined axis, by a predetermined number of pixels); identifying a parcel with the largest overlap with a dilated property feature segment polygon; determining adjacent dilated property feature segment polygons, such as based on an adjacency matrix; merging the adjacent dilated region segments into a single property feature instance polygon; and repeating the above process until all property feature segment polygons belong to a property feature instance polygon and/or are determined to be a property feature instance polygon (e.g., when a property feature segment polygon is not adjacent to any other property feature segment polygons).

In a fourth variant, property feature instance polygons can be determined based on both property feature segment polygons and heuristics. Determining the property feature instance polygons can include: identifying adjacent property feature segment polygons (connected group of region segments) by computing an adjacency matrix based on the property feature segment polygons; and merging connected property feature segment polygons based on heuristics. The heuristics can include: determining a primary structure by selecting a largest property feature segment polygon, P, as the primary structure, and additionally selecting one or more auxiliary property feature segment polygons (P', where P'↑P) as additional primary structures, where P' includes property feature segment polygons with similar size as P (e.g., the area covered by P' is within a predetermined threshold to the area covered by P, such as within 5%, 10%, etc.); and associating unassigned property feature segment polygons with the primary structures and/or the additional primary structures in an iterative manner based on the adjacency matrix to determine property feature instance polygons. Merging connected property feature segment polygons within a connected group can be based on one or more parameters. The parameters preferably function to enable smaller structures to merge with a larger structure, limit the length of transitive chains (transitive closures), and/or perform any other suitable functionality. In some embodiments, the parameters can include maximum chain length, minimum area ratio upper bound, and minimum area ratio lower bound. Maximum chain length is a value (e.g., 2, 3, 4, 5, etc.) that functions to limit the length of a transitive chain from secondary structures to primary structure. A minimum area ratio is a parameter determined based on the minimum area ratio upper bound and the minimum area ratio lower bound, which is used to determine the primary structures and additional primary structures. The minimum area ratio upper bound is a value between the minimum area ratio lower bound and 1 (e.g., 0.6, 0.7, 0.8, 0.9, etc.). The minimum area ratio lower bound is a value between 0 and the minimum area ratio upper bound (e.g., 0.4, 0.3, 0.2, 0.1, etc.).

However, the property feature instance polygons can be otherwise determined.

Determining a property feature instance training target for the region image can function to determine the label for the train image that can be used with the train image to train the segmentation module in S500. The property feature instance training target can be determined using the data generation module (e.g., using the training target inference algorithm, and/or any other suitable algorithm).

The property feature instance training target is preferably determined based on the property feature instance polygons, but can additionally or alternatively be determined based on the property feature segment polygons, and/or any other suitable information.

In a first variation, determining the property feature instance training target can include: combining the property feature instance polygons into a set of final property feature instance polygons for the train image. Combining the property feature instance polygons can be performed using the training target inference algorithm, using summary statistics (e.g., averaging, determining the median, determining the mode, etc.), using rule sets or heuristics that are part of the data generation module, and/or using other modules.

In this variation, combining the property feature instance polygons can include ranking the property feature instance polygons (e.g., based on the labeler's estimated accuracy, experience, etc.), and combining the property feature instance polygons based on the ranked property feature instance polygons.

Ranking the property feature instance polygons can include: optionally removing duplicate property feature instance polygons; determining an intersection over union matrix using a pairwise comparison between each property feature instance polygon; determining a transition matrix (e.g., probabilities) based on (e.g., function of, such as using a SoftMax function) the intersection over union matrix; and determining a stationary state distribution, which imposes a ranking on the property feature instance polygons, by applying a stochastic process, such as a random walk, to the transition matrix. Additionally or alternatively, ranking the property feature instance polygons can be performed by manually inspecting the property feature instance polygons in comparison to the train image that depicts the property features. However, the property feature instance polygons can be otherwise ranked or not ranked.

Performing training target inference (e.g., to determine the property feature instance training target) based on the ranked property feature instance polygons can include determining a seed polygon using non-maximum suppression; iterating the seed polygon through the ranked property feature instance votes, and inferring a property feature instance training target (e.g., binary label, probability label, etc.) based on the seed and the seed supporters (e.g., property feature instance votes that support and/or are similar to the seed).

Figure 4:
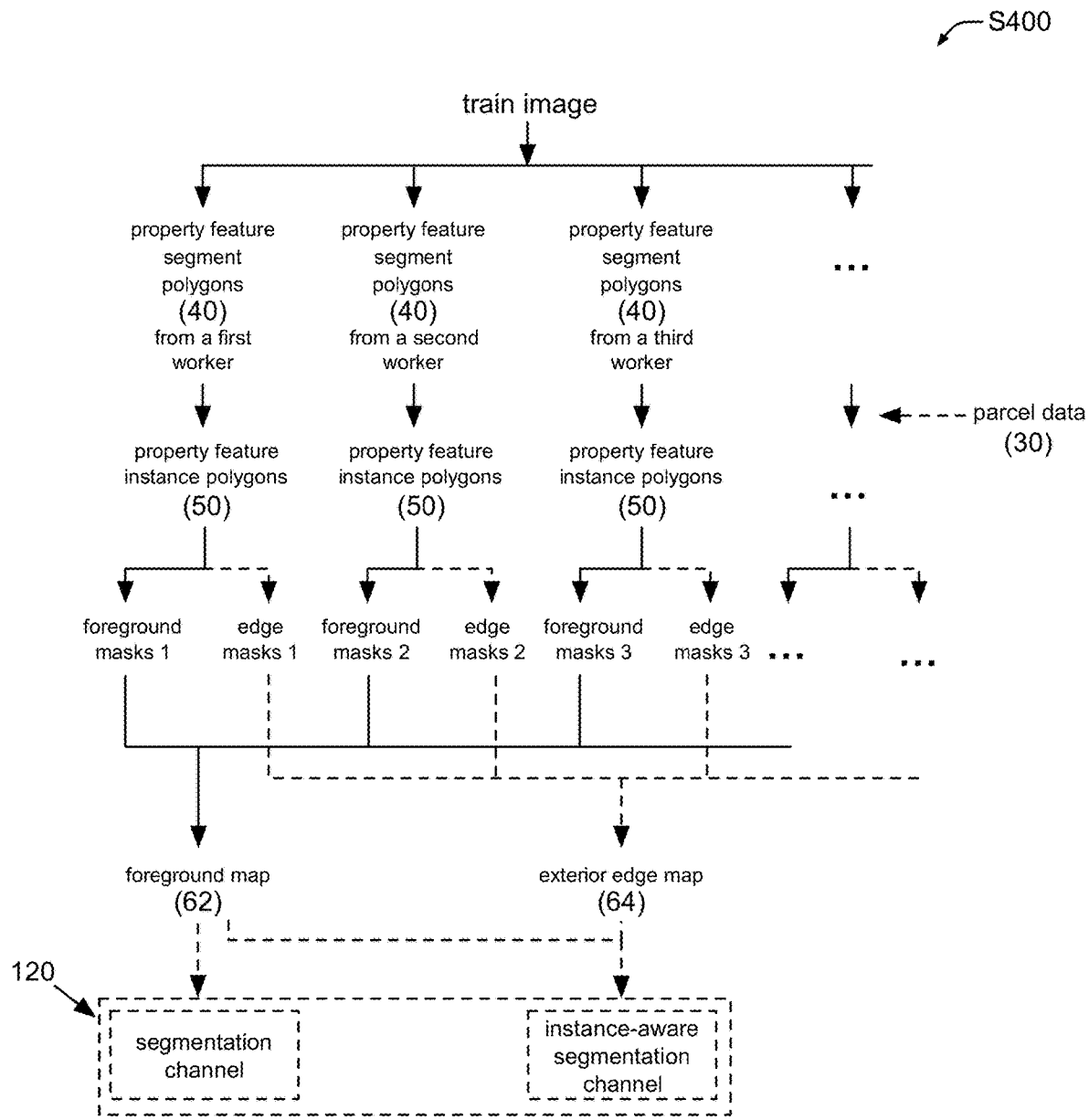
FIG. 4 depicts an embodiment of S400.

In a second variant, determining the property feature instance training target can include: determining an auxiliary mask for the property feature instance polygons (e.g., different masks for different sets of property feature instance polygons determined by different labelers, single mask for all instance polygons, etc.); and combining, such as using a summary statistic, the auxiliary masks across all (or a subset thereof) the property feature instance votes to determine an auxiliary heatmap. In an embodiment, two auxiliary masks are determined using the above specified process and include a foreground mask and an exterior edge mask (e.g., as depicted in FIG. 4).

In a specific example of determining the foreground heatmap, determining foreground mask for each set of property feature instance polygons per labeler can include: rendering the property feature instance interiors; and combining the foreground masks by averaging the foreground masks to create the foreground heatmap.

In a specific example of determining the exterior edge heatmap, determining the exterior edge mask for each set of property feature instance polygons per labeler can include: rendering the property feature instance exterior edges with a given thickness (e.g., 1 m, ½ m, ⅓ m, ¼ m, ⅕ m, etc.); and combining the exterior edge masks by averaging the exterior edge masks to create the exterior edge heatmap.

In a third variation, determining the property feature instance training target can include using the inference algorithm to determine a property feature instance training target and determining a foreground heatmap and an exterior edge heatmap based on the property feature instance training target.

In a fourth variation, determining the property feature instance training target can be based on the intersection of overlapping property feature instance polygons (e.g., across multiple property feature instance polygons determined by different labelers) to determine a confidence score for property feature or not property feature.

In a fifth variation, when there is a single set of property feature instance polygons (e.g., determined by a single labeler), the property feature instance training target can be the set of property feature instance polygons.

In a sixth variation, determining the set of property feature instance training targets can include: selecting the most popular property feature instance polygons from the population of property feature instances as the property feature instance training target. The most popular property feature instance polygons can be the property feature instance polygons with the largest overlap with other property feature instance polygons for a given parcel or geographic region (e.g., determined using a voting scheme), or otherwise defined.

In a seventh variation, determining the property feature instance training target can include: averaging the property feature instance polygons for each parcel or geographic region (e.g., based on pixels associated with the property feature instance polygon); and treating the averaged property feature instance polygons as the property feature instance training target.

In an eighth variation, determining the property feature instance target can include: treating each property feature instance polygon as a vote (e.g., on a per-pixel basis, on a region basis), and assigning a semantic label (e.g., property feature or not-property-feature) to each pixel or image region based on the number of votes (e.g., majority vote, supermajority votes, more than a threshold number of votes, etc.).

However, the property feature instance training target can be otherwise determined.

Determining a property feature instance training target for the region image can optionally include artificially inserting air gaps between adjacent property feature instances of a final property feature instance polygon (e.g., using the foreground heatmap and the exterior edge heatmap, manually etc.). In variants, inserting air gaps can include inserting a value indicative of the background (e.g., 0), instead of the current value indicative of a property feature instance (e.g., 1), where the outer-edge and/or foreground of a first property feature instance overlaps with the foreground of a second property feature instance. In variants, the value associated with the air gap can be weighted (e.g., weighted more than a background pixel, such as 2×, 3×, 4×, etc.).

However, determining a property feature instance training target can include any other suitable elements.

4.5 Training a Segmentation Module Using the Training Data S500.

Training a segmentation module using the training data can function to determine a trained segmentation module for use in S300. Training the segmentation module is preferably performed after generating the training data, and more specifically, after each train image is associated with a respective property feature instance training target, but can alternatively be trained at any time. The segmentation module training is preferably supervised (e.g., semantic segmentation, instance-aware segmentation, etc.), but can additionally or alternatively be unsupervised (e.g., nearest neighbor clustering, neural networks, etc.), and/or semi-supervised (e.g., neural networks, graph-based methods, etc.). The segmentation module can include a semantic segmentation module, an instance-aware segmentation module, a parcel-aware instance-aware segmentation module, a pixel-accurate module, and/or any other suitable module.

The segmentation module can include one or more input channels. The data received by the input channels can include the region image (RGB), parcel boundaries, parcel foreground mask (e.g., determined by rendering the parcel interiors in addition to the parcel boundaries), and/or any other suitable information.

In a first example, the segmentation module can include a single input wherein the input can include parcel boundaries (or other suitable data) rendered onto the region image (e.g., overlaid over the region image), such that the input includes three channels represented in RGB space.

In a second example, the segmentation module can include a single input with multiple channels (multi-dimensional, such as a matrix, tensor, etc.) wherein the channels correspond to the region image, the parcel boundaries, and the parcel foreground mask, respectively, or parameters thereof (e.g., the region's three RGB channels).

In a third example, the input can correspond to just the region image and the parcel boundaries, just the region image and the parcel foreground mask, just the region image, and/or any other suitable configuration.

The segmentation module can include one or more output heads. The output heads can be trained to learn particular segmentation tasks (e.g., semantic segmentation, instance-aware, instance-aware parcel-aware, classification tasks, etc.).

In a first example, the segmentation module includes a single output channel that is trained to learn instance-aware parcel-aware segmentation.

In a second example, the segmentation module includes two output heads, wherein the first output channel is trained to learn the foreground heatmap and the second channel is trained to learn an instance aware heatmap (e.g., a function of the foreground heatmap, F, and the exterior edge heatmap, E). In a specific example, the second output channel can be trained to learn $F'=F*(1-E)$.

In a third example, the segmentation module includes a single output channel that is trained to learn semantic segmentation (e.g., labels each pixel with a property-feature or not-property-feature label).

However, the segmentation module can include any other suitable number of output heads, configured to output any other suitable output.

The segmentation module is preferably trained using the property feature instance training target for a train image, but can additionally or alternatively be trained using the all (or a subset thereof) of the property feature segment polygons for the train image, or any other label for the train image. Additionally or alternatively, the segmentation module can be trained using synthetic images and labels, wherein a teacher network can generate the synthetic images and labels and a student network (e.g., the segmentation module, or other model) can be trained using the synthetic images and labels.

Training the segmentation module can include using a training loss function, such as to determine model parameters of the segmentation module. The training loss function can be binary cross entropy, weighted binary cross entropy, and/or any other suitable loss function. Training the segmentation module can include weighting the training loss such that the pixels associated with the air gap are weighted more. The pixels associated with the air gap can be weighted by a weight factor, such as scalar value (e.g., 2, 3, 4, 5, 6, 7, 8, 9, etc.), by a weight mask, and/or otherwise weighted.

The weight mask, W, can be a function of F and F'. In a specific example, the weight mask can be defined as $W=1+(F-F')$. In a second specific example, the weight mask can be defined as $W=1+(F-F')*value$, such as one of the scalar values defined above.

The segmentation module can be pre-trained on a first set of images (e.g., generic images such as depicting known objects, or other images) before being trained using the train images, or not pretrained.

However, the segmentation module can be otherwise trained.

Embodiments of the method can include every combination and permutation of the various method processes, wherein one or more instances of the method and/or processes described herein can be performed asynchronously (e.g., sequentially), concurrently (e.g., in parallel), or in any other suitable order by and/or using one or more instances of the elements and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
receiving a region image that depicts a property feature;
determining an instance-aware mask for the property feature and a semantic segmentation mask for the property feature, based on the region image;
computing a distance transform from the instance-aware mask;
determining a flooded mask by assigning instance identifiers to pixels of the instance-aware mask based on the distance transform; and
generating a pixel-accurate mask by combining the flooded mask and the semantic segmentation mask.

2. The method of claim 1, wherein the region image is an aerial image.

3. The method of claim 1, the region image comprises depth information.

4. The method of claim 1, wherein the property feature comprises at least one of: a roof, driveway, paved surface, vegetation, or waterfront.

5. The method of claim 1, further comprising:
retrieving parcel data for a region depicted in the region image; and
using the parcel data, in addition to the region image, to determine the instance-aware mask and the semantic segmentation mask.

6. The method of claim 5, wherein the parcel data is retrieved from a third-party datastore.

7. The method of claim 5, wherein the parcel data represents parcel boundaries for parcels depicted in the region image.

8. The method of claim 1, wherein the instance-aware mask represents an under segmented version of the property feature, and wherein property features belonging to different parcels are separated by a predetermined distance of pixels of the instance-aware mask.

9. The method of claim 1, wherein the instance-aware mask and the semantic segmentation mask are determined by a segmentation module.

10. The method of claim 9, wherein the segmentation module is trained using training data generated by:

receiving multiple property feature segment polygon sets for a train image, wherein the train image depicts a plurality of property features in a region;

retrieving parcel data for the region;

generating an instance polygon set by combining contiguous property feature segment polygons, from a property feature segment polygon set, that are within a parcel defined by the parcel data; and generating a label for the train image by combining the instance polygon sets;

wherein the train image and the label are used to train the segmentation module.

11. The method of claim 1, wherein the distance transform determines, for pixels in the instance-aware mask, the distance to a nearest property feature instance represented by the instance-aware mask, and wherein the instance identifiers are assigned to the pixels in the instance-aware mask, using the watershed transform.

12. A method for generating training data for property feature segmentation, comprising:

receiving a region image of a property feature;

receiving multiple property feature segment polygon sets for the region image;

retrieving parcel data for a region depicted in the region image;

generating an instance polygon set by combining contiguous property feature segment polygons of a property feature segment polygon set that are within a common parcel, where in the common parcel is determined based on the parcel data; and generating a label for the region image by combining the instance polygon sets;

wherein the region image and the label are used to train a segmentation module.

13. The method of claim 12, wherein the label comprises a foreground heatmap and an edge heatmap, wherein the segmentation module comprises a first output channel that is configured to output a first output heatmap, wherein the segmentation module receives the region image as input and is trained based on a comparison between the first output heatmap and the foreground heatmap.

14. The method of claim 12, wherein the label comprises a foreground heatmap and an edge heatmap, the method further comprising:

calculating an instance-aware heatmap by multiplying the foreground heatmap by a transformation of the edge heatmap; and using the instance-aware heatmap to train the segmentation module.

15. The method of claim 14, wherein the segmentation module comprises an additional second output head that outputs a second output heatmap, wherein a comparison between the second output heatmap and the instance-aware heatmap is used to train the segmentation module.

16. The method of claim 12, wherein the segmentation module is trained using a weighted loss function, wherein pixels inside of a predetermined area of the region image are weighted more than pixels outside of the predetermined area.

17. The method of claim 16, wherein the pixels inside of the predetermined area are weighted using a weight mask, wherein the weight mask comprises a transformation of the label, and wherein the transformation is multiplied by a weight factor.

18. The method of claim 12, wherein the label comprises a foreground heatmap and an edge heatmap, wherein the foreground heatmap comprises rendered interiors of polygons, and wherein the edge heatmap comprises rendered exterior edges of polygons.

19. The method of claim 12, wherein the multiple property feature segment polygon sets are determined manually and the multiple instance polygon sets are determined automatically.

20. The method of claim 12, wherein the region image is an aerial image.

21. A system, comprising a set of processors connected to memory, that is configured to perform the method of any of claims 1-20.

* * * * *